J. J. WOOD.
CLOTHES WRINGER.
APPLICATION FILED APR. 5, 1921.
Reissued Jan. 10, 1922.
15,266.
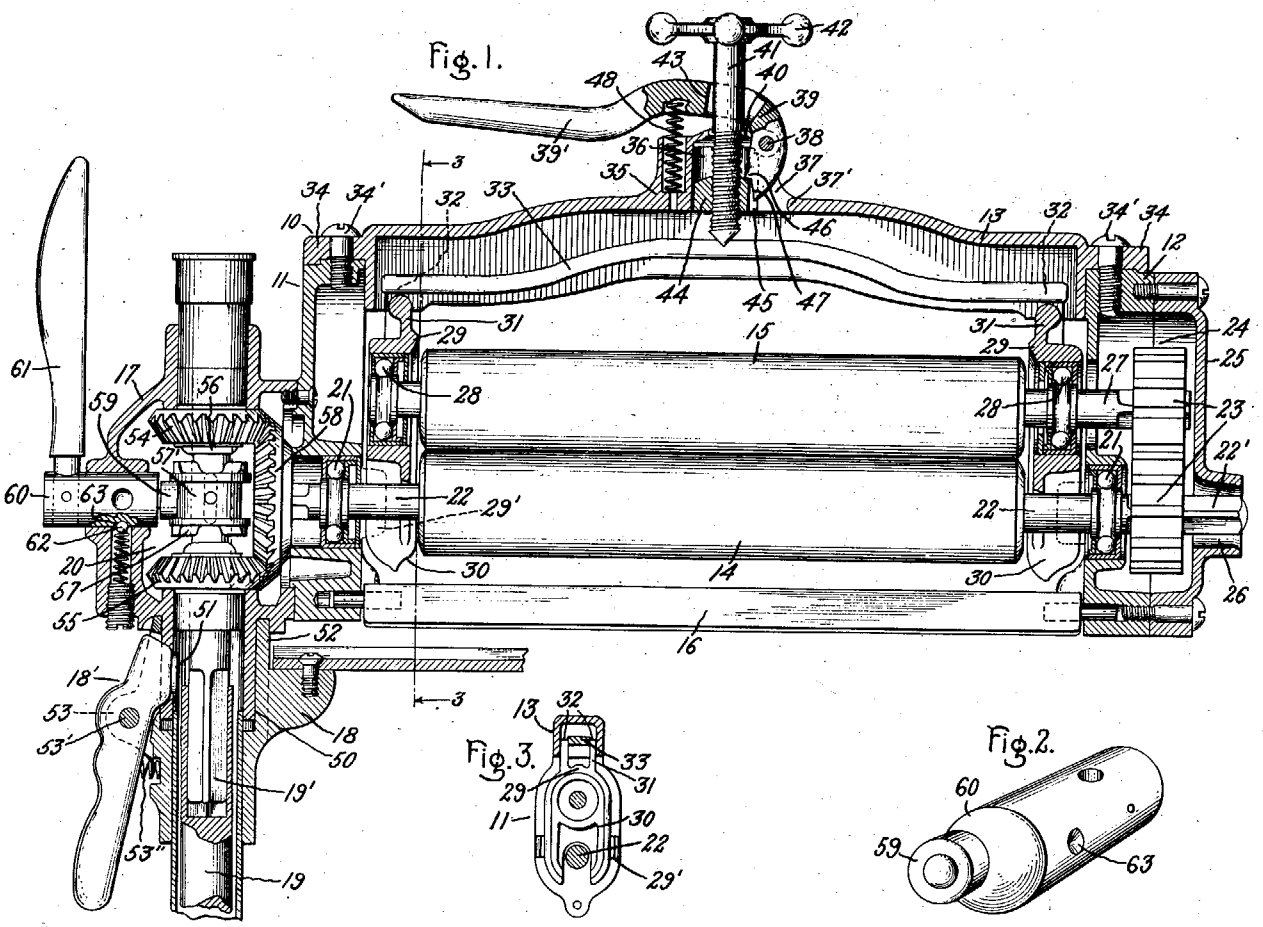
Inventor:
James J. Wood,
by Albert G. Davis
His Attorney.

UNITED STATES PATENT OFFICE.

JAMES J. WOOD, OF FORT WAYNE, INDIANA, ASSIGNOR, BY MESNE ASSIGNMENTS, TO GENERAL ELECTRIC COMPANY, A CORPORATION OF NEW YORK.

CLOTHES WRINGER.

15,266. Specification of Reissued Letters Patent. Reissued Jan. 10, 1922.

Original No. 1,327,690, dated January 13, 1920, Serial No. 246,646, filed July 25, 1918. Application for reissue filed April 5, 1921. Serial No. 458,763.

*To all whom it may concern:*

Be it known that I, JAMES J. WOOD, a citizen of the United States, residing at Fort Wayne, in the county of Allen and State of Indiana, have invented certain new and useful Improvements in Clothes Wringers, of which the following is a specification.

My invention relates in some features more particularly to clothes wringers intended to be power driven, as is the case where they are used in conjunction with power washing machines, and in some particulars it bears more especially on a safety release for permitting sudden removal of the tension between the rolls, as is sometimes requisite to prevent injury to the hands of the operator or damage to materials being wrung. My invention consists in the features of construction and arrangement hereinafter more fully described and pointed out in the claims. In the drawing wherein I have illustrated an embodiment of my invention Figure 1 is a front elevation, with parts in section, showing the construction of the wringer and its association with the power shaft, Fig. 2 is a a detail of a clutch-shifting member, and Fig. 3 is a detail of a frame member for the power roll.

In the drawings 10 indicates in general the wringer frame, shown as comprising end castings 11 and 12 connected by a bridge or top member 13, such frame supporting the lower and upper rolls 14 and 15 and the pivoted drip board 16. The frame as an entirety is secured at its end member 11 to a rotatable head 17 carried by a supporting bracket 18, rigidly mounted in any suitable fashion, not shown, with respect to the fixed support such as the washing machine frame. A latch structure 18′ associated with the bracket 18 locks the rotatable head 17 in adjusted position on the bracket, and a shaft 19, driven from a suitable source of power, not shown, extends up through the bracket 18 to connect with reversing gearing 20 within the head 17 to drive the shaft for roll 14.

In the specific construction shown the side casting 11 of the wringer frame has a ballbearing 21 for a shaft 22 of roll 14, the opposite extremity of the shaft being supported in a similar ballbearing 21 in end casting 12. Each ballbearing preferably has its cup member forced into the frame part, whereas the shaft makes a neat but slidable fit with the inner, or grooved member. The shaft has a squared end to detachably engage an element of the spur gear couple 23, that is housed in a chamber 24 of frame member 12 and the cover plate 25 for such chamber screwed to the frame end 12, has an aperture 26 to give access to the polygonal extremity 22′ of shaft 22, so adapting the wringer to receive a hand crank. The other member of the gear couple 23 is mounted on the squared end portion of shaft 27 for the upper roll 15, and this shaft is supported in ballbearings 28 in vertically movable guide members 29, each of which is a casting guided vertically between lugs 29′ of the frame ends and the sides of the bridge 13. Each guide has pendant limbs 30 that straddle the shaft 22 between roller 14 and the proximate end frame 11 or 12 and has an upper end 31, notched as at 32 to receive the tension spring 33 that extends above the roll-couple between these inner frame members 29. The bridge 13 is a channeled brace having end ears 34 screwed at 34′ to the tops of the end frames 11 and 12, the downwardly opening channel of the bridge receiving within it the extremities 32 of the inner frame members and the spring 33 that spans between them. Upon top of the bridge is a boss or dome 35 having a downwardly opening circular recess 36 with which communicates a slot 37, the side walls of which are formed to afford bearing for a pintle 38 for a latch lever 39. Through the top of the dome there is an opening 40 loosely to receive a screw or threaded spindle 41 bearing a hand wheel 42, this screw preferably extending through a relatively large opening 43 in lever 39, and within the dome engaging a circular nut 44 slotted as at 45 along one side and capable of axial movement to the extent of the height of the dome-recess. The downwardly extending head of lever 39 is shaped to work in slot 37 with edge 37′ as a back-stop. It constantly engages in the slot 45 and has a tooth 46 to engage the top of the nut when its nose 47 is fully in the slot 45, at which time the horizontally extending handle portion 39′ of the lever is fully raised by the action of coiled spring 48 that seats in opposed recesses in the lever and the dome. Accordingly when the parts are in the normal position shown in Fig. 1 the upward pressure on nut 44 tends to lock the handle 39′ raised, and nut 44 is held near the bottom of the dome-recess against both rotary displacement and axial movement by the head of lever 39. Obviously by turning screw 41 the point of the spindle, bearing on the center of spring 33, may be screwed down to put the spring under desired tension and press the rolls 14 and 15 together. Downward pressure exerted on handle 39′ moves the tooth 46 of latch lever 39 into register with slot 45 in the nut so that the latter, relieved of vertical restraint, will spring up into the top of the dome. This motion is enough fully to relieve the pressure between the rolls and prevent injury to the hand of the operator or to material in passing between the rolls. Of course to restore the lock to normal position the spindle will be screwed back until nut 44 can drop down again under the tooth 46 of the latch, after which the threaded spindle is turned to retension the spring 33.

In the arrangement for swinging the wringer I prefer that head 17 shall have a tubular base extension 50 provided with several vertical slots 51 and extending down into a tubular bearing portion 52 of bracket 18. On ears 53 of the bracket I mount a pivot 53′ for the latch 18′, the nose of which may enter any one of the appropriate slots 51 as the latch is pressed home by its spring 53″. By pressing on the handle of the latch the head 17 is freed to rotate in its position of adjustment with respect to the bracket 18, and the head is freed for detachment from the bracket.

The shaft 19 I preferably make to telescope non-rotatably with a polygonal end of a shaft stub 19′ that extends vertically through the head 17 and has, rotatably mounted thereon, two beveled gears 54 and 55, each provided with clutch teeth 56 for engagement with the teeth of a clutch member 57 that is slidable on but rotatable with shaft section 19′. Both loose gears engage gear 58 slip fitted on the squared end of wringer shaft 22. The clutch element 57, when in neutral position as shown in Fig. 1, disengages both of the beveled gears and leaves the wringer idle, and for throwing the clutch to engage either gear selectively, the grooved central zone 57′ of the clutch is engaged by a roller 59 mounted eccentrically on a stud 60 that extends through a bearing in the end wall of the head 17 and externally carries the operating handle 61. A detent ball 62 spring supported in a recess in said end wall, engages, in the three critical positions of the stud 60, with depression 63, so that the operating handle 61 tends always to reside in one of its critical positions.

Among the advantages of the construction it may be pointed out that the removability of the entire head 18 with the wringer, and shaft stub 19′ attached is very desirable, to facilitate packing, making repairs, etc., and the removability of the rolls is especially advantageous. One has but to loosen screw 34′ at the right of Fig. 1 to detach head 12 and with it remove gears 23 from the squared shaft ends. The rolls on their shafts may then be removed from engagement with their bearing rings, shaft 22 slipping out of engagement with gear 58. The arrangement for enabling the wringer to be hand operated by attaching a handle to shaft 22′ is also very desirable.

While I have herein described in some detail a specific embodiment of my invention, it will be understood that changes in particular construction may be made without departure from the spirit of my invention within the scope of my appended claims.

What I claim is:

1. In a clothes wringer, a frame having a bridge, a roll relatively fixed in said frame, a roll relatively movable in said frame, a single spring for acting on both ends of the last said roll to press it toward the other, a tension screw for said spring, a nut for said screw through which it is screwed to tension the spring, a housing carried by the frame in which said screw and nut are arranged to move axially, and a latch carried by said frame engaging said nut so as to prevent rotation and vertical displacement thereof, said latch movable to free the nut for vertical displacement.

2. In a wringer, the combination with the lower roll, the upper roll bodily movable toward and away therefrom, inner frame members affording bearing at opposite ends in the upper roll, a spring spanning between said members, a single tension screw bearing on the center of said spring, a nut on said screw, a main frame providing a space in which said nut and screw may have axial movement, and a latch for said nut carried by said frame, said nut having a vertical slot therein, and said latch having an end normally engaging the slot and the top of said nut to prevent both rotation and axial displacement and movable to engage only the slot to prevent rotary displacement while permitting axial displacement of the nut.

3. A wringer having frame ends connected by a bridge having a downwardly open channel and a central downwardly opening dome, a lower roll supported in said frame end, an upper roll, end bearings therefor, a tension spring spanning between said bearings and located in the channel of the bridge, a single screw loosely extending through said dome engaging the center of the spring, a nut on said screw axially slidable in said dome, a lever pivoted in said dome having a head passing through an opening in the side of said dome, said head being provided with a tooth 46 and said nut being provided with a receptive slot 45 substantially as described.

4. In a clothes-wringer, a main frame having a removable end member and an opposite end member, a head connected with said opposite end member, gearing in said head a roll having a shaft making endwise slip connection with an element of said gearing, a companion roll and its shaft, a vertically slidable guide-frame therefor located between the end members of the main frame, connecting gears demountably connected with the outer ends of said two shafts, and bearings for the roll-shafts demountable from said shafts and carried respectively by the main and guide-frames, whereby upon removal of the detachable end member the rolls can be removed.

5. In a clothes-wringer a main frame having a detachable end member, a head carrying an opposite end member, bearing in said head, a roll having a shaft slidably engaged with an element of said gearing, an upper roll having a shaft guide-frame, bearings for the upper roll in the guide-frame, bearings for the lower roll in the end members of the main frame, the removable end member of said frame afforded a chamber, connecting gears slidably engaging the roller shafts and arranged in said chamber, whereby upon removal of said end member the rollers may be detached endwise from their bearings and gear connections.

6. A wringer having frame ends connected by a bridge having a downwardly open channel, lower and upper rolls supported in said frame ends, end bearings therefor, a tension spring means engaging said bearings and located in the channel of the bridge, a screw which at its lower end engages said spring means, said screw extending upward between the side walls of the channel-shaped bridge and freely through an opening in the top wall of the bridge, a nut vertically movable with the screw, a lever pivoted on the frame to one side of the screw and provided with a part adapted to engage the nut to hold it from vertical movement, said lever being movable in a vertical plane to disengage said part from the nut, means which at all times holds the nut against rotative movement but permits it to move vertically, and a hand wheel on the upper end of said screw for turning it to adjust the tension on the rolls.

7. A wringer having frame ends connected by a bridge having a downwardly open channel, lower and upper rolls supported in said frame ends, end bearings therefor, a tension spring means engaging said bearings and located in the channel of the bridge, a screw which at its lower end engages said spring means, said screw extending upward between the side walls of the channel shaped bridge and freely through an opening in the top wall of the bridge, a nut vertically movable with the screw, a lever pivoted on the frame to move in a vertical plane, said lever having a part which holds the nut from vertical movement, said screw projecting upward beyond said lever, means which holds the nut from rotative movement, said lever when moved in a vertical plane on its pivot releasing the nut to permit it to move axially, and a hand wheel on the upper end of said screw for turning it to adjust the tension on the rolls.

8. In a clothes wringer, a frame comprising end members and a bridge, rolls mounted in the end members, springs means for putting said rolls under tension, a screw which passes freely through an opening in the bridge and at its inner end engages said spring means, a nut on the screw which nut is adapted to move vertically, a lever pivoted on the bridge to move in a vertical plane, said lever having a part which engages the nut to hold the nut from vertical movement, said lever when moved downwardly disengaging the part from the nut to release the nut for vertical movement, and means for holding the nut from turning.

9. In a clothes wringer, a frame comprising end members and a bridge, rolls mounted in the end members, spring means for putting said rolls under tension, a screw which passes freely through an opening in the bridge and at its inner end engages said spring means, a nut on the screw which nut is adapted to move vertically, a lever pivoted on the bridge to move in a vertical plane, said lever having a part which engages the nut to hold the nut from vertical movement, upward pressure of the nut on the lever part acting to hold the lever in raised position, said lever when moved downward disengaging the part from the nut to release the nut for vertical movement, and means for holding the nut from turning.

10. In a clothes wringer having a frame, rolls, and a screw for increasing and decreasing the tension on the rolls, the combination of a nut on the screw, a lever pivoted at one end on the frame to move in a vertical plane, and having a part which engages the nut to hold it against vertical movement, said part lying on the same side of a vertical plane including the axis of the lever pivot as the free end of the lever whereby upward pressure of the nut on the part acts to hold the lever in raised position, said part being adapted to be released from the nut upon downward movement of the free end of the lever.

11. In a clothes wringer having a frame, rolls, and a screw for increasing and decreasing the tension on the rolls, the combination of a nut on the screw, a lever pivoted at one end on the frame on a horizontal pivot so as to swing in a vertical plane, said pivot being at one side of the nut with the free end of the lever extending to the other side thereof, a tooth carried by the lever and adapted to engage the nut to hold it from vertical movement, said tooth when in engagement with the nut lying on the same side of the pivot as the free end of the lever whereby upward pressure of the nut on the tooth acts to hold the lever in raised position and downward movement of the free end of the lever moves said tooth from engagement with the nut.

In witness whereof, I have hereunto set my hand this 1st day of April, 1921.

JAMES J. WOOD.